United States Patent

Röll et al.

[11] Patent Number: 5,935,517
[45] Date of Patent: Aug. 10, 1999

[54] METHOD OF PREVENTING METAL DUSTING CORROSION OF DUCTS WHICH CONDUCT HOT GAS MIXTURES CONTAINING CARBON MONOXIDE

[75] Inventors: Werner Röll, Wächtersbach; Friedrich W. Hohmann, Langen, both of Germany

[73] Assignee: Metallgesellschaft AG, Frankfurt am Main, Germany

[21] Appl. No.: 08/591,828

[22] Filed: Jan. 25, 1996

[30] Foreign Application Priority Data

Jan. 28, 1995 [DE] Germany .................... 195 02 788

[51] Int. Cl.⁶ ............................................ C23C 8/08
[52] U.S. Cl. ......................... 422/9; 138/148; 138/149
[58] Field of Search .................. 138/149, 148; 422/9

[56] References Cited

U.S. PATENT DOCUMENTS

| | | | |
|---|---|---|---|
| 2,915,367 | 12/1959 | Olson et al. | 423/613 |
| 4,048,352 | 9/1977 | Pignocco et al. | 138/148 |
| 4,582,094 | 4/1986 | Stausebach | 138/149 |
| 4,936,871 | 6/1990 | Wilmer et al. | 48/206 |
| 4,995,427 | 2/1991 | Berchem | 131/148 |
| 5,078,182 | 1/1992 | Kraft | 138/149 |
| 5,490,974 | 2/1996 | Hohmann et al. | 422/197 |

FOREIGN PATENT DOCUMENTS

| | | |
|---|---|---|
| 0 004 401 | 10/1979 | European Pat. Off. . |
| 0 258 907 | 3/1988 | European Pat. Off. . |
| 38 09 313 A1 | 10/1989 | Germany . |
| 43 27 176 C1 | 1/1995 | Germany . |
| 195 02 788 C1 | 9/1996 | Germany . |

*Primary Examiner*—Robert Warden
*Assistant Examiner*—Theresa T. Snider
*Attorney, Agent, or Firm*—Herbert Dubno

[57] ABSTRACT

A carbon monoxide containing gas mixture at a temperature of 500° C. is conducted through the inner protective tubing of a sheath tube lined with a thermally insulating protecting composition. The inner tubing is divided into sections and a potentially CO-free mass is introduced in the sheath tube in the regions of the thermally insulating mass to permeate the latter and form a barrier between the carbon monoxide gas and sheath tube, thereby eliminating hot spots and metal dusting corrosion.

2 Claims, 2 Drawing Sheets

METHOD OF PREVENTING METAL DUSTING CORROSION OF DUCTS WHICH CONDUCT HOT GAS MIXTURES CONTAINING CARBON MONOXIDE

FIELD OF THE INVENTION

The present invention relates to a method and to an apparatus for conducting a carbon-monoxide-containing gas and, especially, a hot gas mixture at a temperature of at least 500° C.

BACKGROUND OF THE INVENTION

It is common to many industrial ducting application to conduct hot carbon monoxide mixtures using a duct having an outer sheath tube lined with a thermally insulating composition and an inner pipe or tube for protecting the composition against erosion by the hot gas mixture transversing the duct.

Carbon-monoxide-containing hot gas mixtures for which the method and apparatus of the invention are intended, are found in systems for producing and processing or utilizing raw synthesis gases whose main components are hydrogen and carbon monoxide. Such gases can be produced, for example, by cracking of natural gas, by gasification of liquid hydrocarbons or by the gasification of coal. Process and reactors for these purposes can include those described in Ullmann's Encyclopedia of Industrial Chemistry, 5th Edition, Volume A 12, Pages 192 to 208.

They include also the tube furnace disclosed in detail in German Patent document DE-A 43 27 176.

The protective tube which is provided inwardly of the thermally insulating composition is divided into sections so that length changes of this tube resulting from temperature fluctuations can take place without restraint and therefore, without damage to the thermally insulating lining. The latter may be a tamping mass or other packing material as is used for the lining of metallurgical vessels, e.g. a alumina, silica or magnesia mass. The ability of the sections to expand and contract prevents binding or destruction of the internal protective tubing. The successive sections of this tubing are generally not mechanically fixed together to permit the expansion in length and, of course, contraction. The result is a butt joint which may permit small streams of the carbon monoxide containing gas to migrate outwardly into and through the protective composition as far as to the inner surface of the sheath tube.

After long operating periods, this leakage of the hot carbon-monoxide-containing gas may produce hot spots of the sheath tube.

Furthermore since the sheath tube is generally made of steel and steel is attacked by carbon monoxide, the sheath tube can be weakened and destroyed by the resulting formation of carbides. The formation of such carbides, referred to in the trade as metal dusting, is a recognized problem with duct work for such gas compositions.

The thermally insulating protective composition, which is a commercially available ramming or tamping compound or refractory lining material is usually porous so that the lining can allow the carbon-monoxide-containing hot gas mixture to pass to the inner surface of the sheath tube at least by diffusion.

The carbon-monoxide-containing hot gas mixture is, as has been noted, at a temperature of at least 500° C. and in most cases at a temperature ranging from 600 to 1500° C. The gas mixture usually has a CO content of at least 50% by volume.

Upon contact: of the CO with the metal, particularly steel at these temperatures, the reaction $2CO \rightarrow CO_2 + C$ can occur with the C atom acting as a radical causing carbide formation in the metal. It is this carbide formation that is referred to as metal dusting corrosion and takes place commonly at temperatures in the range of 500° C. to 850° C.

OBJECTS OF THE INVENTION

It is an object of the present invention to provide a method of conducting or ducting hot carbon monoxide containing gas mixtures at temperatures of 500° C. or higher, whereby metal dusting corrosion of the outer sheath tube cannot occur and the drawbacks of earlier methods are obviated.

Another object of this invention is to provide a method of conducting carbon monoxide containing gas mixtures which avoids the formations of carbides and hot spots in the hot gas line.

It is also an object of our present invention to provide an apparatus for carrying out the method of the invention, i.e. an improved hot gas duct system, which will obviate the drawbacks of earlier systems as has been described.

SUMMARY OF THE INVENTION

These objects and others which will become apparent hereinafter are attained, in accordance with the present invention in a method which prevents the attack of carbon monoxide gas mixtures upon at least the sheath tube of the duct by an introduction at least at one location along the length of that sheath tube of a substantially CO-free gaseous or vaporous protective fluid into the region of the thermal insulating composition, thereby causing this CO-free gas to block access of the CO-containing gas to the sheath tube through the thermally insulating composition.

The substantially CO-free fluid is preferably supplied at a multiplicity of locations over the length of the sheath tube. It can consist at least predominantly of water vapor, hydrogen, nitrogen, carbon dioxide or mixtures thereof. The protective fluid fills voids in the space between the metal sheath tube and the inner protecting tubing so that an attack of the CO-containing hot gas upon the sheath tube is precluded.

The method of the invention thus can comprise:

(a) internally lining a metal sheath tube with a porous thermally insulating protective composition, and providing internally of the thermally insulating protective composition an inner protective tube divided into sections along a length of the sheath tube, thereby forming a duct;

(b) passing a carbon-monoxide-containing gas which is at a temperature of at least 500° C. through the duct; and (c) introducing a substantially CO-free gaseous protective fluid through the sheath tube at at least one location over a length thereof into a region of the thermally insulating protective composition whereby the substantially CO-free gaseous protective fluid permeates the thermally insulating protective composition.

In its apparatus aspects, a duct according to the invention can comprise:

a porous thermally insulating protective composition internally lining the metal sheath tube;

an inner protective tube divided into sections along a length of the sheath tube and provided inwardly of the thermally insulating protective composition; and means including at least one inlet opening in the metal sheath tube for introducing a substantially CO-free gaseous protective fluid through the sheath tube into the duct at a region of the thermally insulating protective composition whereby the substantially CO-free gaseous protective fluid permeates the thermally insulating protective composition.

According to the invention, a metal connection ring is provided between the sheath tube and at least one section of the protective tube and the CO-free fluid is provided in the region of this connection to protect the connecting element from the corrosive action of metal dusting.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
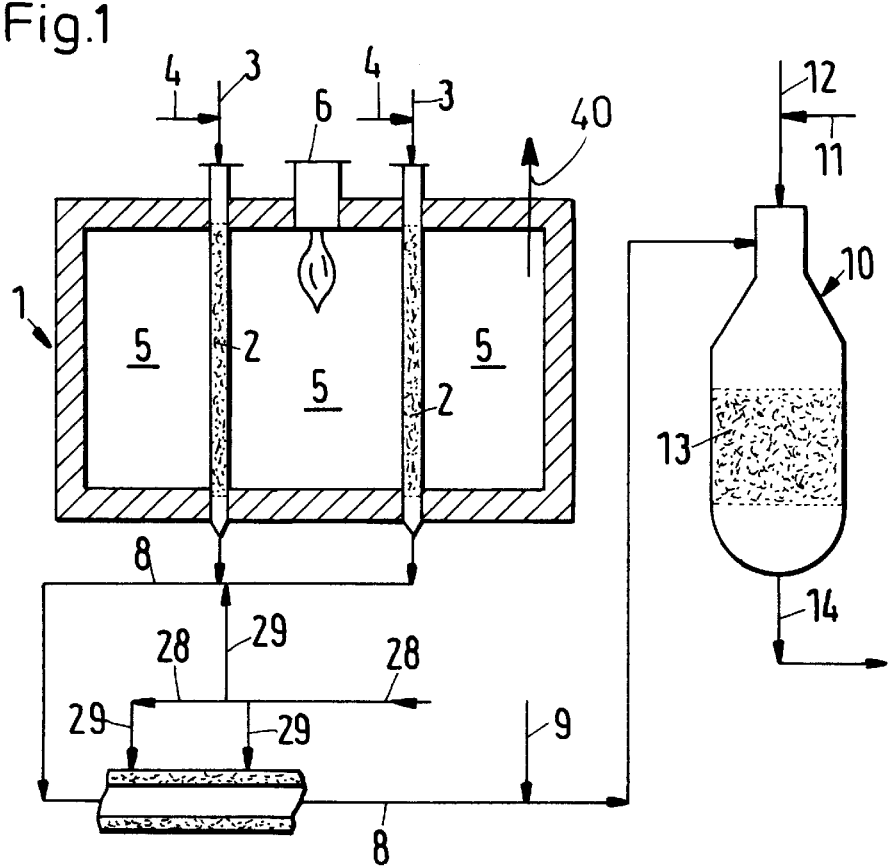
FIG. 1 is a flow diagram with structures shown in cross section, schematically illustrating the hot gas line between two reactors in which the present invention is applicable.

FIG. 1 shows one of a number of possible applications of the present invention in which hot gas lines may be used to conduct a CO-containing gas. A tube furnace 1 comprises a multiplicity of tubes 2 filled with a granular catalyst, such as a nickel catalyst. Natural gas is supplied via lines 3 and hydrogen via lines 4 for reaction in the catalyst-containing tubes 2 at a temperature in the range of 700° C. to 1000° C. to form a cracked gas rich in $H_2$ and CO.

The tubes 2 are disposed in a combustion chamber 5 provided with a multiplicity of burners 6, only one of which has been shown. The hot combustion gases are carried off as represented by the line 40.

The fuel for the burner 6 can be natural gas and the burners can also be supplied with air as is customary for combustion of the fuel.

The hot product gas which is rich in carbon monoxide and is formed in the tubes 2, can contain $H_2$ and CO in a total amount of at least 40% by volume. The product gas is collected in the hot gas line 8 and is conducted thereby to an autothermic cracking reactor 10. Natural gas can be added to the product gas at line 9.

In the reactor 10, oxygen supplied via line 11 and water vapor supplied via line 12 are reacted with the product gas in a bed 13 of the granular catalyst which also may be the nickel catalyst. Raw synthesis gas is withdrawn in the hot gas line 14 at a temperature in the range of 800 to 1300° C. and is supplied to a plant utilizing the synthesis gas, e.g. a plant for the synthesis of ammonia or methanol. As illustrated in FIG. 1, raw synthesis gas may be produced by gasification of carbonaceous materials or by a partial oxidation without the use of a catalyst. The hot gas lines with which the invention is concerned are the lines 8 and 14 of FIG. 1 which carry carbon-monoxide-containing hot gas mixtures.

It is schematically shown in FIG. 1 that the hot gas line 8 is supplied at a plurality of locations through branch lines 29 extending from a main line 28, with a gas, such as water vapor, which is substantially free of carbon monoxide. Details of the duct system aria shown in FIGS. 2 and 3.

The duct system can comprise a sheath tube 17 which can be composed of steel and which is internally lined by the thermally insulating protective composition 18, e.g. a ramming mass of alumina and magnesia. An internal protective tube is disposed inwardly of the thermally insulating composition 18 and is composed of a plurality of sections 20, 21 and 22. A gap 25 is provided at the butt joint between adjacent sections.

Adjacent to each butt-joint gap 25 each section is connected to the sheath tube 17 by a conical metal ring 27 e.g. by welding. Because the metal ring 27 and its joints are gas tight, the ring constitutes a gas barrier between the sheath tube and the protective tube.

A tubular element or apron 26 overlapping the ends of the tube section, is provided adjacent to each butt joint across the gap 25 and is welded to the downstream section. The space between each apron 26 and the section 20, 21 or 22 opens at a mouth 31 in the direction of arrow 41, i.e. in the same direction as the flow A of carbon monoxide containing gas through the duct.

The protective fluid, in the form of a gas or vapor, flows through the branch lines 28 and 29 (as diagrammatically represented by arrow 29a) and first enters an annular chamber 30 left free in the lining 18. From that chamber the protective fluid can freely diffuse through the porous protective composition 18 to permeate the letter and partly or completely fill any voids in the region between the section 20, 21 or 22 of the protective tubing and the sheath tube.

Because the metal rings 27 are also particularly susceptible to metal dusting corrosion the CO-free fluid is supplied close to the metal rings as is indicated by the locations of the pipes 29 and their inlet openings to the chambers 30 and the positions of these chambers.

Figure 2:
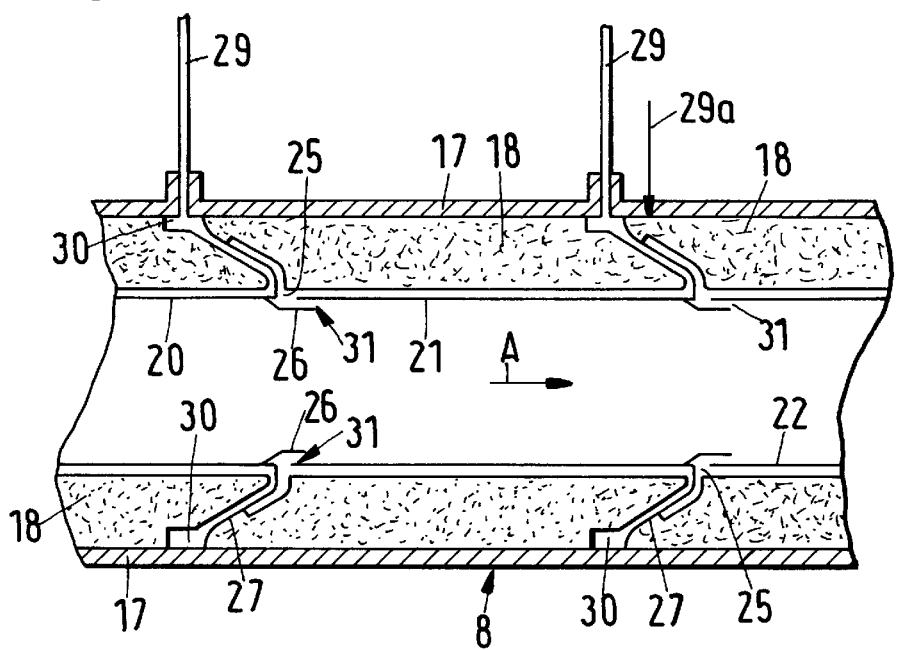
FIG. 2 is a longitudinal section showing a portion of the hot gas line in a larger scale.
Figure 3:
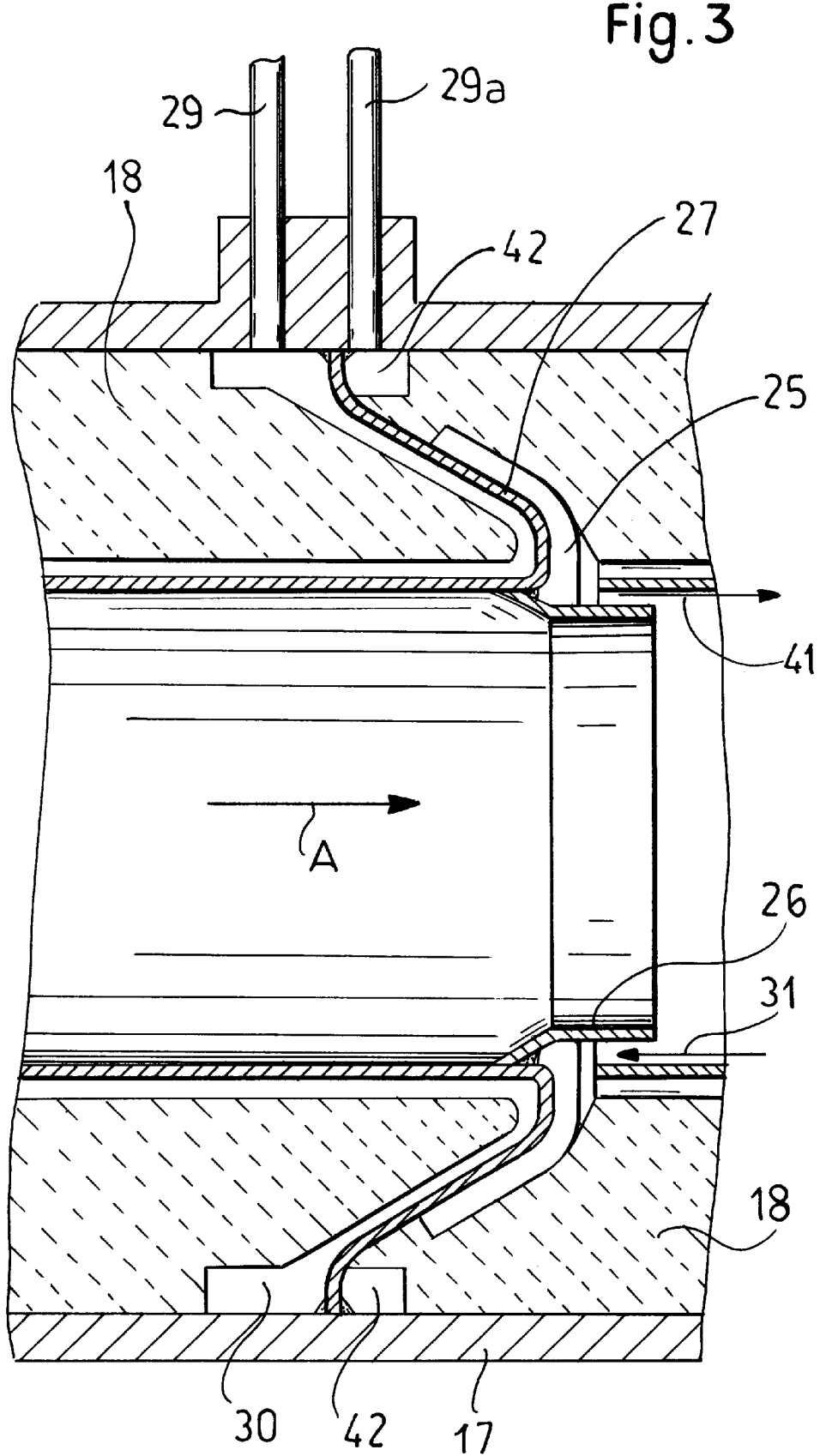
FIG. 3 is a detail, drawn to still a larger scale, of the region at which the CO-free gas is admitted.

As has been illustrated by the arrow 20a in FIG. 2 and by the corresponding pipe in FIG. 2, the protective fluid can be supplied on both sides of the metal ring. A chamber 42 can thus be provided on the opposite side of the metal ring 27 as has been indicated in FIG. 3. The protective fluid is conducted at a suitable subatmospheric pressure to the chambers 30 and 42 and then is distributed through the thermally insulating lining 18. The protective fluid escapes through the gaps 25 and is discharged into the carbon monoxide containing gas at 41.

We claim:

1. A method of conducting a carbon-monoxide-containing gas in a sheath tube to prevent metal dusting corrosion which comprises the steps of:

(a) providing a metal sheath tube internally lined with a porous thermally insulating protective composition, and providing internally of said thermally insulating protective composition an inner protective tube divided into a plurality of sections along a length of said sheath tube, a gap being provided between each two neighboring sections, a gastight metal ring being provided between the sheath tube and each of said sections, forming chambers in said protective composition in the vicinity of each gap and adjacent each metal ring;

(b) passing a carbon-monoxide-containing gas a temperature of at least 500° C. through said inner protective tube; and (c) introducing a substantially CO-free gaseous protective fluid through a plurality of branch lines and through said sheath tube into each of said chambers in said thermally insulating protective composition whereby said protective fluid permeates said thermally insulating protective composition, said fluid being at least predominantly a gas selected from the group consisting of water vapor, hydrogen, nitrogen, carbon dioxide and mixtures thereof and metal dusting corrosion is inhibited.

2. The method defined in claim 1 wherein said chambers in said protective composition are formed at both sides of at least one metal ring, both chambers being adjacent said ring and protective fluid being introduced into both chambers.

* * * * *